United States Patent
Zhu et al.

(10) Patent No.: US 9,749,306 B2
(45) Date of Patent: Aug. 29, 2017

(54) METHOD, DEVICE AND COMMUNICATIONS SYSTEM FOR NETWORK CONVERGENCE

(71) Applicant: Huawei Technologies Co., Ltd., Shenzhen (CN)

(72) Inventors: Chunsheng Zhu, Shanghai (CN); Baoqing Huang, Shenzhen (CN); Qi Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/542,053

(22) Filed: Nov. 14, 2014

(65) Prior Publication Data

US 2015/0074761 A1    Mar. 12, 2015

Related U.S. Application Data

(63) Continuation of application No. PCT/CN2012/082715, filed on Oct. 10, 2012.

(30) Foreign Application Priority Data

May 15, 2012  (CN) .......................... 2012 1 0149929

(51) Int. Cl.
  *G06F 7/04*    (2006.01)
  *H04L 29/06*   (2006.01)
  (Continued)

(52) U.S. Cl.
  CPC .............. *H04L 63/08* (2013.01); *G06F 21/31* (2013.01); *H04W 12/06* (2013.01); *H04W 88/16* (2013.01)

(58) Field of Classification Search
  CPC ........ H04L 63/08; G06F 21/31; H04W 12/06; H04W 88/16
  (Continued)

(56) References Cited

U.S. PATENT DOCUMENTS

2004/0132427 A1   7/2004  Lee et al.
2005/0041640 A1*  2/2005  Nasielski .............. H04W 68/00
                                                     370/352
(Continued)

FOREIGN PATENT DOCUMENTS

CN    101309172 A    11/2008
CN    101442507 A     5/2009
(Continued)

OTHER PUBLICATIONS

"3$^{rd}$ Generation Partnership Project; Technical Specification Group Services and System Aspects; Architecture enhancements for non-3GPP accesses (Release 11)," 3GPP TS 23.402, V11.2.0, pp. 1-251, 3$^{rd}$ Generation Partnership Project, Valbonne, France (Mar. 2012).

(Continued)

*Primary Examiner* — Aravind Moorthy
(74) *Attorney, Agent, or Firm* — Leydig, Voit & Mayer, Ltd.

(57) ABSTRACT

Embodiments of the present invention provide a method, a device and a communications system for network convergence, which can support a charging manner of a network to which an access user belongs. The method for network convergence includes: after authentication of an access user is successful, receiving, by a second gateway, a PDN connection establishment message corresponding to the access user, where the message carries an access user identifier and is sent by a first gateway, the first gateway is a gateway of a first network in which the access user is currently located, and a service borne by the PDN connection corresponding to the access user includes a network side service of the access user in the first network; and initiating, by the second gateway, according to the access user identifier, a charging procedure corresponding to the access user.

13 Claims, 9 Drawing Sheets

After authentication of an access user is successful, a second gateway receives a PDN connection establishment message corresponding to the access user, where the message carries an access user identifier and is sent by a first gateway — S101

The second gateway initiates, according to the access user identifier, a charging procedure corresponding to the access user — S102

(51) Int. Cl.
*H04W 12/06* (2009.01)
*G06F 21/31* (2013.01)
*H04W 88/16* (2009.01)

(58) Field of Classification Search
USPC .......................................................... 726/3, 4
See application file for complete search history.

(56) References Cited

U.S. PATENT DOCUMENTS

| | | | |
|---|---|---|---|
| 2007/0133558 A1* | 6/2007 | Wu | H04L 12/2859 370/395.5 |
| 2010/0290392 A1* | 11/2010 | Rasanen | H04L 12/14 370/328 |
| 2011/0280180 A1* | 11/2011 | McCann | H04L 63/08 370/328 |
| 2012/0264402 A1* | 10/2012 | Zhang | H04L 63/0815 455/411 |
| 2012/0300778 A1* | 11/2012 | Tamura | H04L 12/66 370/392 |
| 2013/0094395 A1* | 4/2013 | Lopez | H04W 48/17 370/254 |
| 2014/0016553 A1* | 1/2014 | Nishida | H04W 68/005 370/328 |
| 2014/0016763 A1* | 1/2014 | Li | H04L 12/1428 379/114.2 |

FOREIGN PATENT DOCUMENTS

| | | |
|---|---|---|
| CN | 101692727 A | 4/2010 |
| CN | 102204306 A | 9/2011 |
| EP | 2034660 A1 | 3/2009 |
| EP | 2106076 A1 | 9/2009 |
| EP | 2480015 A1 | 7/2012 |
| JP | 2006041962 A | 2/2006 |
| WO | WO 2004036871 A1 | 4/2004 |
| WO | WO 2004043008 A1 | 5/2004 |
| WO | WO 2011020498 A1 | 2/2011 |

OTHER PUBLICATIONS

Ruggeri et al., "802.11-Based Wirelesss-LAN and UMTS interworking: requirements, proposed solutions and open issues," Computer Networks, vol. 47, Issue 2, pp. 151-166, Elsevier, Amsterdam, Netherlands (Feb. 2005).

Xia et al., "Virtual Prepaid Token for Wi-Fi Hotspot Access," Proceedings of the 29$^{th}$ Annual IEEE International Conference on Local Computer Networks, Institute of Electrical and Electronics Engineers, New York, New York (2004).

* cited by examiner

METHOD, DEVICE AND COMMUNICATIONS SYSTEM FOR NETWORK CONVERGENCE

CROSS REFERENCE

This application is a continuation of International Patent Application No. PCT/CN2012/082715, filed on Oct. 10, 2012 which claims priority to Chinese Patent Application No. 201210149929.1, filed on May 15, 2012, both of which are hereby incorporated by reference in their entireties.

TECHNICAL FIELD

The present invention relates to the field of communications, and in particular, to a method, a device and a communications system for network convergence.

BACKGROUND

With the rapid development of mobile communications systems, various networks are being rapidly constructed globally. Some networks such as LTE (Long Term Evolution), though having high performance, support only a limited number of terminal types and require a high cost. Some other network technologies such as WiFi (Wireless Fidelity) have been mature, and require a low cost. By adopting a converged network, a service can be implemented through different networks, thereby effectively utilizing network resources.

In the prior art, when a user of a first network accesses a second network, a signal of the access user is converted to a signal of the second network. However, because the first network to which the access user belongs is different from the second network, the access user adopts a Qos (Quality of Service) management and charging manner of the second network in the second network, and the second network does not support a Qos management and charging manner of the first network to which the access user belongs. For example, the first network is WiFi, and the second network is LTE. When a WiFi user intends to access the LTE network, a WiFi function is built in a CPE (Customer Premise Equipment), a terminal accesses the CPE through WiFi, and the CPE converts a WiFi signal to an LTE signal and accesses an LTE-EPC (Evolved Packet Core) network. However, the EPC network side only sees the CPE terminal but does not perceive the WiFi user, and Qos management and charging is performed by taking the CPE terminal as a smallest unit.

SUMMARY

Embodiments of the present invention provide a method, a device and a communications system for network convergence, which can support a charging manner of a network to which an access user belongs.

To achieve the foregoing objectives, the embodiments of the present invention adopt the following technical solutions:

According to one aspect, a method for network convergence is provided and includes:

after authentication of an access user is successful, receiving a packet data network PDN connection establishment message corresponding to the access user, where the message carries an access user identifier and is sent by a first gateway, the first gateway is a gateway of a first network in which the access user is currently located, and a service borne by the PDN connection corresponding to the access user includes a network side service of the access user in the first network; and initiating, according to the access user identifier, a charging procedure corresponding to the access user.

According to one aspect, a method for network convergence is provided and includes:

obtaining an access user identifier in an access user authentication process;

generating a PDN connection establishment message corresponding to an access user, where the message carries the access user identifier; and sending, to a second gateway, the PDN connection establishment message corresponding to an access user, so that after the PDN connection corresponding to the access user is established, the second gateway initiates, according to the access user identifier, a charging procedure corresponding to the access user, where the second gateway is a gateway of a second network to be accessed by the access user.

According to one aspect, a first gateway is provided and includes:

a user identifier obtaining unit, configured to obtain an access user identifier in an access user authentication process;

a first message generating unit, configured to generate a PDN connection establishment message corresponding to an access user, where the message carries the access user identifier; and a first message sending unit, configured to send, to a second gateway, the PDN connection establishment message corresponding to the access user, so that after the PDN connection corresponding to the access user is established, the second gateway initiates, according to the access user identifier, a charging procedure corresponding to the access user, where the second gateway is a gateway of a second network to be accessed by the access user.

According to one aspect, a second gateway is provided and includes:

a first message receiving unit, configured to, after authentication of an access user is successful, receive a packet data network PDN connection establishment message corresponding to the access user, where the message carries an access user identifier and is sent by a first gateway, the first gateway is a gateway of a first network in which the access user is currently located, and a service borne by the PDN connection corresponding to the access user includes a network side service of the access user in the first network; and a charging initiating unit, configured to initiate, according to the access user identifier, a charging procedure corresponding to the access user.

According to one aspect, a system for network convergence is provided and includes:

an AAA network element, configured to record an access user identifier in a registration process of an access user;

a PCRF network element, configured to store a charging policy of the access user;

a BSS, configured to charge the access user according to a call detail record of the access user;

a first gateway, configured to obtain the access user identifier in an access user authentication process and generate a PDN connection establishment message corresponding to the access user, where the message carries the access user identifier, and a service borne by the PDN connection corresponding to the access user includes a network side service of the access user in a first network; where the first gateway is further configured to send, to a second gateway, the PDN connection establishment message corresponding to the access user, so that the second gateway allocates an IP address to the PDN connection corresponding to the access user and initiates, according to the access user identifier, a charging procedure corresponding to the access user, where the first gateway is a gateway of the first network in which the access user is currently located, and the second gateway is a gateway of a second network to be accessed by the access user; and the second gateway, configured to, after authentication of an access user is successful, receive the PDN connection establishment message corresponding to an access user, where the message carries the access user identifier and is sent by the first gateway, and initiates, according to the access user identifier, the charging procedure corresponding to the access user.

The embodiments of the present invention provide the method, the device and the communications system for network convergence, where the method for network convergence includes: After authentication of an access user is successful, a second gateway receives a PDN connection establishment message corresponding to the access user, where the message carries an access user identifier and is sent by a first gateway, the first gateway is a gateway of a first network in which the access user is currently located, and a service borne by the PDN connection corresponding to the access user includes a network side service of the access user in the first network; and the second gateway initiates, according to the access user identifier, a charging procedure corresponding to the access user. In this way, after the second gateway receives the PDN connection establishment message corresponding to the access user, the PDN connection corresponding to the access user is established, and the second gateway initiates, according to the access user identifier, the charging procedure corresponding to the access user. The charging procedure is implemented, in a charging manner of the first network to which the access user belongs, on a bearer of the PDN connection corresponding to the access user. Therefore, the communications system can support the charging manner of the network to which the access user belongs.

BRIEF DESCRIPTION OF DRAWINGS

To describe the technical solutions in the embodiments of the present invention or in the prior art more clearly, accompanying drawings required for describing the embodiments or the prior art are introduced below briefly. Apparently, the accompanying drawings in the following descriptions merely show some embodiments of the present invention, and persons of ordinary skill in the art may further obtain other drawings according to these accompanying drawings without creative efforts.

DESCRIPTION OF EMBODIMENTS

The technical solutions in the embodiments of the present invention are clearly described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
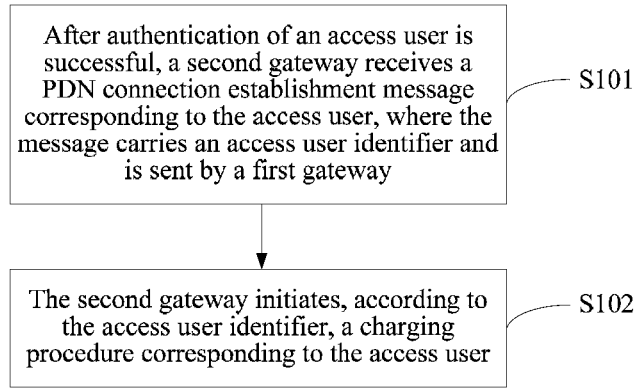
FIG. 1 is a flowchart of a method for network convergence according to an embodiment of the present invention.

An embodiment of the present invention provides a method for network convergence, where, as shown in FIG. 1, the method includes:

S101: After authentication of an access user is successful, a second gateway receives a PDN connection establishment message corresponding to the access user, where the message carries an access user identifier and is sent by a first gateway.

The first gateway is a gateway of a first network in which the access user is currently located, and the second gateway is a gateway of a second network to be accessed by the access user. A service borne by the PDN connection corresponding to the access user includes a network side service of the access user in the first network.

S102: The second gateway initiates, according to the access user identifier, a charging procedure corresponding to the access user.

In this way, after the second gateway receives the PDN connection establishment message corresponding to the access user, the PDN connection corresponding to the access user is established, and the second gateway initiates, according to the access user identifier, the charging procedure corresponding to the access user. The charging procedure is implemented, in a charging manner of the network to which the access user belongs, over the PDN connection corresponding to the access user. Therefore, a communications system can support the charging manner of the network to which the access user belongs, and meanwhile, can implement charging according to the PDN connection corresponding to the access user, which refines a unit of charging, thereby implementing more accurate charging.

It should be noted that, the access user identifier is configured for the access user by an operator during user registration, and the access user identifier is of a same type as a user identifier of a user of the second network, so the access user may be identified by the second gateway of the second network. Exemplarily, when a WiFi user accesses an LTE network, the access user identifier may be an IMSI (International Mobile Subscriber Identity)/MSISDN (Mobile Station International ISDN Number). In an actual application, a virtual user may be created in the second network, the identity of the access user corresponds to an identity of the virtual user, and after the PDN connection is established, the access user and the virtual user form a mapping. Particularly, the access user is further configured with a corresponding first network user identifier during registration, which may be a username and password, for authentication of the access user. The user authentication in the embodiment of the present invention is independent authentication for each access user.

Meanwhile, the charging procedure in S101 specifically includes: generating, by the second gateway, a charging start message carrying the access user identifier; sending the charging start message to a BSS (Business Support System), so that the BSS starts the charging procedure; generating a call detail record of the access user carrying the access user identifier; and sending the call detail record of the access user to the BSS, so that the BSS charges the access user according to the call detail record of the access user. It should be noted that, the second gateway exchanges information with a PCRF (Policy and Charging Rules Function) network element, the PCRF network element stores a charging policy of the access user, the second gateway performs charging according to the charging policy and then reports a call detail record to the BSS, and the BSS may integrate the charging call detail record reported by the second gateway, where a unified call detail record may be output for a plurality of users in a unit of a family or dormitory.

When the access user is offline, the second gateway receives a message for deleting the PDN connection corresponding to the access user; generates a charging stop message carrying the access user identifier; and sends the charging stop message to the BSS, so that the BSS stops charging. In this way, the charging procedure of the access user in the accessed second network is ended. Particularly, when the first gateway is powered off or is faulty, abnormal phenomena occur, for example, there is no data traffic after a predetermined period of time is expired, and the second gateway may perceive, according to these abnormal phenomena, that the first gateway is not available, and actively stop charging.

Further, the second gateway may send the access user identifier to the PCRF network element, so that the PCRF network element searches for and returns access-user quality of service information corresponding to the access user identifier. The second gateway receives the access-user quality of service information returned by the PCRF network element. The access-user quality of service information corresponding to the access user identifier is recorded in the PCRF network element. Then, the second gateway performs, according to the access-user quality of service information, resource management and scheduling control for the PDN connection corresponding to the access user. A process of resource management and scheduling control is substantially the same as that in the prior art, a managed object is the PDN connection corresponding to the access user, and details are not described herein.

In this way, the second gateway may initiate, by using the access user identifier, a Qos management procedure corresponding to the access user, can support a Qos management manner of the network to which the access user belongs, and meanwhile, may implement Qos management according to the PDN connection corresponding to the access user, which refines a unit of Qos management, thereby implementing more accurate Qos management.

It should be noted that, the access user may have two types of data services: One is charged by application software without participation of a network side, and may be called a shared service; and the other is charged by the network side and requires distinguishing access users, and may be called a private service. Particularly, to differentiate a corresponding service, the second gateway may further establish an independent PDN connection. Specific steps are: Before authentication of an access user is successful, the second gateway may receive a message for establishing an independent PDN connection, where a service borne by the independent PDN connection includes the shared service, and the shared service is a service that does not require a network side to distinguish users. Shared services of all access users may be borne by the independent PDN connection, and a private service of the access user may be borne by the PDN connection corresponding to the access user. The message for establishing an independent PDN connection that is received by the second gateway may carry information for service differentiation, such as APN (Access Point Name) information, so as to distinguish two types of services corresponding to different PDN connections and links. In this way, in a communications network, on the basis of supporting the Qos management manner of the network to which the access user belongs, Qos management may be implemented according to the service type, which refines the unit of Qos management, thereby implementing more accurate Qos management.

Further, the PDN connection corresponding to the access user may include more than two links, where these links bear different private services, and the independent PDN connection may also include more than two links, where these links bear different shared services. In this way, further service differentiation may be implemented, and Qos management and charging may be implemented according to the corresponding service. It should be noted that, the link has different names for different networks, but is substantially the same, and for example, it is called a bearer in an LTE network, and called a PDP (Packet Data Protocol) context in a WCDMA (Wideband Code Division Multiple Access) network.

Particularly, a plurality of access users from the first network may access the second network, and according to the number of access users, the second gateway may establish a corresponding number of PDN connections, where each of the access users corresponds to a corresponding PDN connection. Meanwhile, according to service requirements of the access users, each PDN connection may establish a plurality of links, so as to implement further service differentiation for charging and management.

Figure 2:
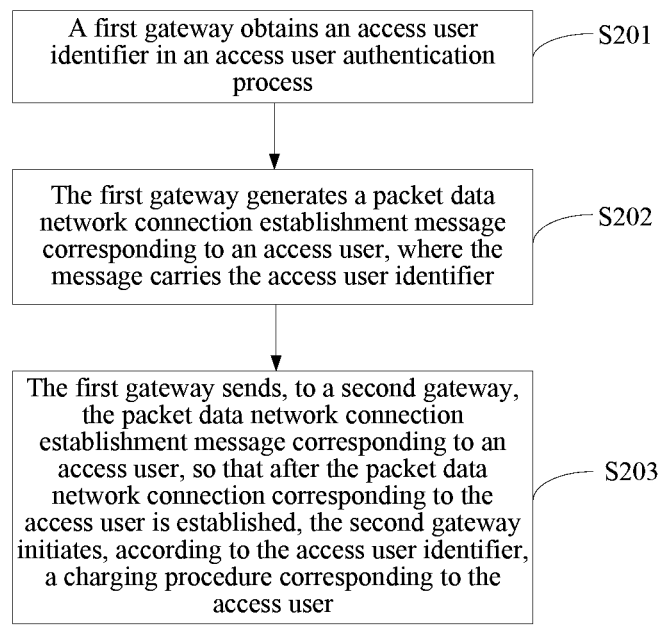
FIG. 2 is a flowchart of another method for network convergence according to an embodiment of the present invention.

An embodiment of the present invention provides a method for network convergence, where, as shown in FIG. 2, the method includes:

S201: A first gateway obtains an access user identifier in an access user authentication process.

S202: The first gateway generates a PDN connection establishment message corresponding to an access user, where the message carries the access user identifier.

S203: The first gateway sends, to a second gateway, the PDN connection establishment message corresponding to an access user, so that after the PDN connection corresponding to the access user is established, the second gateway initiates, according to the access user identifier, a charging procedure corresponding to the access user.

The first gateway is a gateway of a first network in which the access user is currently located, and the second gateway is a gateway of a second network to be accessed by the access user.

In this way, the first gateway sends, to the second gateway, the PDN connection establishment message corresponding to an access user, so that after the PDN connection corresponding to the access user is established, the second gateway initiates, according to the access user identifier, the charging procedure corresponding to the access user. The charging procedure is implemented, in a charging manner of the network to which the access user belongs, over the PDN connection corresponding to the access user. Therefore, a communications system can support the charging manner of the network to which the access user belongs, and meanwhile, can implement charging according to the PDN connection corresponding to the access user, which refines a unit of charging, thereby implementing more accurate charging.

It should be noted that, step S201 specifically includes: receiving, by the first gateway, an authentication request message sent by a portal server; encapsulating, by the first gateway, the authentication request message to generate encapsulated authentication request information; and sending, by the first gateway, the encapsulated authentication request information to an AAA (Authentication, Authorization and Accounting) network element, so that the AAA network element initiates user authentication, and after the user authentication is successful, receiving encapsulated successful-authentication information that carries the access user identifier and is sent by the AAA network element, where the access user identifier is recorded by the AAA network element in a registration process of the access user. Particularly, in the authentication process, information may be encapsulated by adopting RADIUS (Remote Authentication Dial In User Service) encapsulation, and when the first gateway sends the encapsulated authentication request information to the AAA network element, information of assigning a Mac (Medium access control) address of the access user to a Calling-Station-ID (broadband subscriber identifier) field may be carried for identifying the access user. The access user authentication process is implemented jointly by the first gateway and the AAA network element, the first gateway includes a user end device identifiable to the second network, and exemplarily, the user end device may be a CPE. After the authentication is completed, the first gateway records the access user identifier.

Meanwhile, the second gateway may further establish an independent PDN connection, so as to differentiate a corresponding service. Specific steps are: Before authentication of an access user is successful, the first gateway may generate a message for establishing an independent PDN connection; and then sends, to the second gateway, the message for establishing an independent PDN connection. A service borne by the independent PDN connection includes a shared service, and the shared service is a service that does not require a network side to distinguish users. In this way, the shared service may be borne by the independent PDN connection, and a private service may be borne by the PDN connection corresponding to the access user. The message for establishing an independent PDN connection that is sent to the second gateway may carry information for service differentiation, so as to distinguish two types of services through different PDN connections and links. In this way, in a communications network, on the basis of supporting the Qos management manner of the network to which the access user belongs, Qos management may be implemented according to the service type, which refines a unit of Qos management, thereby implementing more accurate Qos management.

Further, the PDN connection corresponding to the access user may include more than two links, so that further differentiation may be implemented for the private service; and the independent PDN connection may include more than two links, so that further differentiation may be implemented for the shared service. Particularly, according to an actual requirement of the access user, the second gateway may further establish a plurality of PDN connections, and each PDN connection may establish a plurality of links, so as to implement further service differentiation, so that Qos management and charging may be implemented according to the corresponding service.

Figure 3:
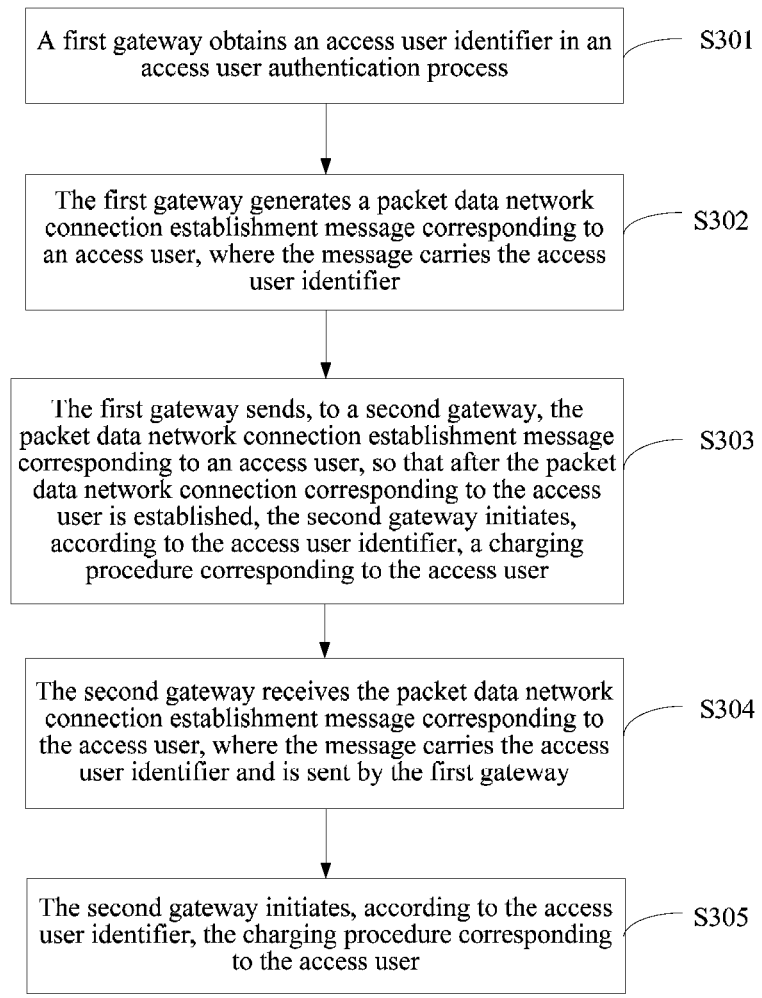
FIG. 3 is a flowchart of still another method for network convergence according to an embodiment of the present invention.

An embodiment of the present invention provides a method for network convergence, where, as shown in FIG. 3, the method includes:

S301: A first gateway obtains an access user identifier in an access user authentication process.

S302: The first gateway generates a PDN connection establishment message corresponding to an access user, where the message carries the access user identifier.

S303: The first gateway sends, to a second gateway, the PDN connection establishment message corresponding to an access user, so that after the PDN connection corresponding to the access user is established, the second gateway initiates, according to the access user identifier, a charging procedure corresponding to the access user.

S304: The second gateway receives the PDN connection establishment message corresponding to the access user, where the message carries the access user identifier and is sent by the first gateway.

S305: The second gateway initiates, according to the access user identifier, the charging procedure corresponding to the access user.

In this way, the first gateway sends, to the second gateway, the PDN connection establishment message corresponding to an access user, so that after the PDN connection corresponding to the access user is established, the second gateway initiates, according to the access user identifier, the charging procedure corresponding to the access user. The charging procedure is implemented, in a charging manner of the network to which the access user belongs, over the PDN connection corresponding to the access user. Therefore, a communications system can support the charging manner of the network to which the access user belongs, and meanwhile, can implement charging according to the PDN connection corresponding to the access user, which refines a unit of charging, thereby implementing more accurate charging.

Figure 4:
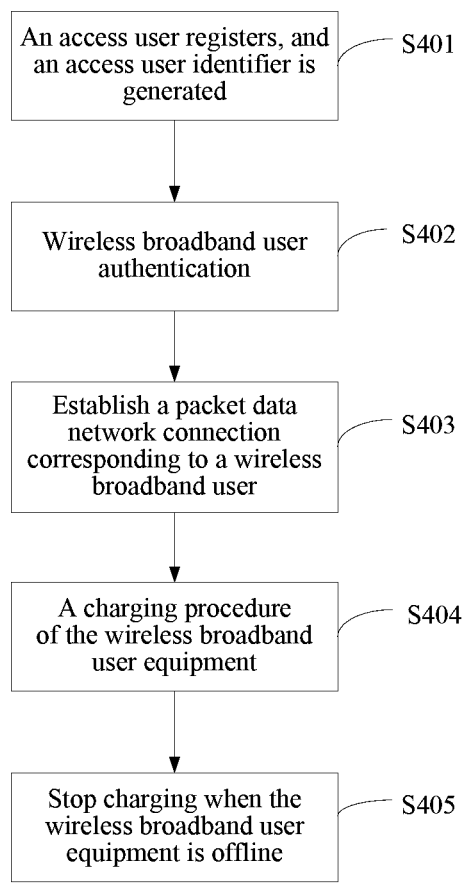
FIG. 4 is a flowchart of yet another method for network convergence according to an embodiment of the present invention.

Because the first gateway and the second gateway in the present invention are adjusted compared with the prior art, adaptations are also made to other processes accordingly. Exemplarily, a complete procedure of a method for network convergence according to an embodiment of the present invention is as shown in FIG. 4. Here, by taking that a WiFi user of a WLAN (wireless LAN, wireless local area network) accesses an LTE network as an example, the first network is the WLAN, the second network is the LTE, the access user is the WiFi user, the first gateway is a home gateway Home GW of the wireless local area network, and the second gateway is a packet data network gateway P-GW. The Home GW may include functions of an LTE CPE and a WLAN AP (Access Point), where the CPE and the AP may be integrated, or the CPE and the AP may be separated from each other and connected to each other in a wired manner.

In this way, a WiFi user signal accessing the LTE network can be supported to form a mapping with an LTE virtual user, and the accessing WiFi user can be identified by the LTE network. Because a link included in a PDN in the LTE network is called a bearer, the term "bearer" is used to represent a link in a converged network of WLAN and LTE in the following.

S401: An access user registers, and an access user identifier is generated. Exemplarily, a WiFi user authentication manner in the embodiment of the present invention is Portal authentication, other authentication manners may support digital signature, and herein, the Portal authentication supports username and password authentication. When a WiFi user registers, an operator configures a username and password for the WiFi user, an AAA network element records registration information of the WiFi user. Meanwhile, an HSS (Home Subscriber Service) of an EPC (Evolved Packet Core) network creates a virtual LTE user for the WiFi user, where all information including an IMSI/MSISDN of the virtual LTE user is the same as that of an ordinary LTE user, and the IMSI/MSISDN is the access user identifier of the WiFi user. Adding of the IMSI/MSISDN information of the virtual LTE user to the registration information of the WiFi user to the AAA is to prepare for identifying the WiFi user when the WiFi user accesses an LTE network. The Home GW may include a CPE, the CPE is an LTE user of the LTE-EPC, and the HSS of the EPC network needs to manage user information of the CPE.

When the WiFi user registers, Qos and charging policy information of the WiFi user needs to be saved in a PCRF, and subsequently, a P-GW obtains the information from the PCRF by using a WiFi IMSI as the access user identifier. During user registration, a BSS needs to interact with the AAA/HSS/PCRF network element at the same time, thereby implementing a user registration procedure.

S402: WiFi user authentication. Exemplarily, after the Home GW is started, the included CPE module needs to implement LTE user authentication, and establish a public service PDN default bearer for bearing public information such as subsequent WiFi user authentication information. Because the establishment of the public service PDN default bearer is the same as that in the prior art, details are not described herein. Particularly, if the CPE and the AP are separated from each other, the CPE in the Home GW needs to support a DHCP (Dynamic Host Configuration Protocol) Server function to allocate a private network IP address to the AP, and meanwhile, the AP may add an Option 60 fields to a DHCP message, so as to facilitate the CPE to identify the AP and the WiFi user. It should be noted that, when the CPE and the AP are integrated, the AP and the CPE share an IP address allocated by the P-GW during establishment of a public PDN connection after the user authentication is successful.

Figure 5:
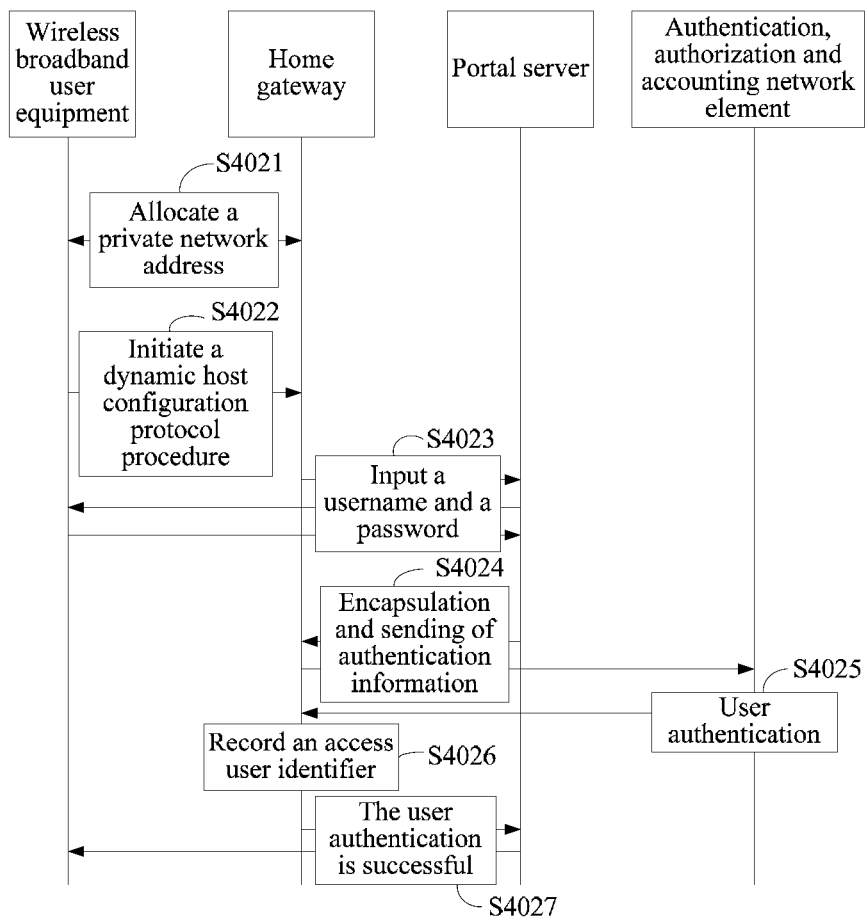
FIG. 5 is a flowchart of authentication of an access user according to an embodiment of the present invention.

After a WiFi UE (User Equipment) finds a WLAN signal through searching, the WiFi UE initiates an authentication procedure, and the Home GW, serving as an authentication point, interacts with the AAA to implement authentication of the WiFi UE. A detailed procedure is shown in FIG. 5.

S4021: The Home GW allocates a private network IP address to the WiFi UE. The Home GW supports a DHCP Server function, and after the IP address is allocated successfully, the Home GW records a mapping between a Mac address of the WiFi UE and the IP address of the WiFi UE.

S4022: The WiFi UE initiates an HTTP service.

S4023: Input a username and a password. A portal server pushes a webpage to the WiFi UE, and the WiFi UE inputs the username and the password and sends the username and the password to the portal server.

It should be noted that, before the username and the password are input, if the Home GW determines, through IP address identification, that authentication of the user is failed, the Home GW redirects to a specified portal server, and if the Home GW supports a portal server function, the Home GW directly pushes the webpage to the WiFi UE without initiating a redirection process.

S4024: Encapsulation and sending of authentication information. The portal server sends an authentication request message carrying authentication information related to the WiFi UE to the Home GW. The Home GW performs Radius encapsulation on the authentication message, assigns the Mac address of the WiFi UE to a Calling-Station-ID (broadband subscriber identifier) field, and sends the message to the AAA through the public service PDN default bearer that is established when the Home GW is started. The Home GW supports setting an AAA IP address, and a setting manner may be near end setting, and may also be configuring through a remote TR069 or OMA-DA.

S4025: WiFi user authentication. The AAA initiates user authentication, and after the authentication is successful, the AAA sends an authentication response message to the Home GW, where the authentication response message carries the Mac address of the WiFi UE in the authentication request message, and carries the IMSI/MSISDN information of the registered WiFi UE.

S4026: Record the access user identifier. After receiving a message that WiFi UE authentication is successful sent by the AAA, the Home GW records that WiFi UE authentication is successful, and does not perform data authentication subsequently, in other words, stops IP address identification, parses a Radius message, and records the WiFi IMSI/MSISDN corresponding to the WiFi UE, namely, the access user identifier of the WiFi user.

S4027: The user authentication is successful. The Home GW sends a user authentication successful message to the portal server, and the portal server pushes a user successful page to the WiFi UE. In this case, the WiFi user authentication is successful, which provides a basis for subsequently establishing the PDN connection corresponding to the access user.

Figure 6:
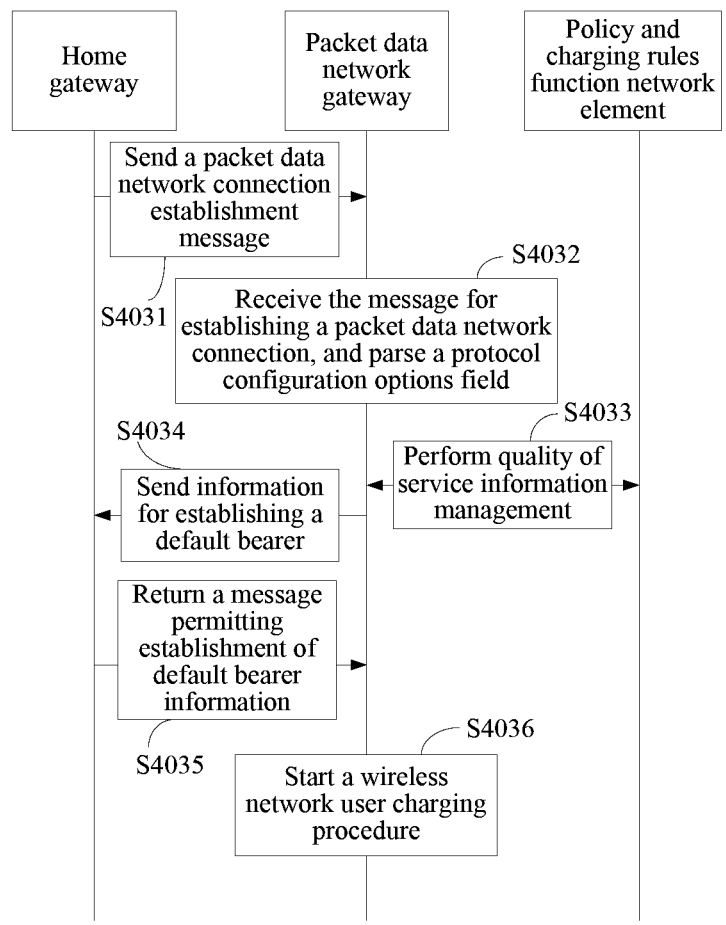
FIG. 6 is a flowchart of establishing a PDN connection corresponding to an access user according to an embodiment of the present invention.

S403: Establish the PDN connection corresponding to the access user. A procedure of establishing the PDN connection corresponding to the access user is substantially the same as the procedure from step S301 to step S305. When the access user is a WiFi user, step S301 to step S305 may be further analyzed as shown in FIG. 6.

S4031: After the WiFi UE authentication is successful, the Home GW sends a message for establishing a PDN corresponding to the WiFi user. In the message for establishing a PDN corresponding to the WiFi user, the IMSI/MSISDN of the WiFi UE, namely, the access user identifier of the WiFi user, is carried in a PCO (Protocol configuration options) field. It should be noted that, herein, the access user identifier of the WiFi user is received by the Home GW from the AAA and recorded in step S4026.

S4032: The P-GW receives the message for establishing a PDN corresponding to the WiFi user, and parses the PCO field.

S4033: Perform Qos information management. If the P-GW parses the PCO field and finds that the message for establishing a PDN corresponds to the WiFi UE, the P-GW obtains Qos information corresponding to the WiFi user from the PCRF by using the WiFi IMSI as the access user identifier, and performs corresponding Qos information management. Because the Qos information management belongs to the prior art, details are not described herein again. Certainly, if the P-GW finds that the PDN is a PDN corresponding to an LTE user, a procedure is the same as an LTE user management procedure in the prior art, and details are not described herein again.

S4034: The P-GW sends, to the Home GW, information for establishing a PDN connection default bearer corresponding to the WiFi user. The P-GW allocates an IP address to the PDN connection corresponding to the WiFi user, where this step is the same as an existing mechanism. Then, the P-GW sends, to the Home GW, the information for establishing a PDN connection default bearer corresponding to the WiFi user.

S4035: The Home GW returns a message permitting establishment of PDN connection default bearer information corresponding to the WiFi user. After the Home GW returns the message permitting establishment of PDN connection default bearer information corresponding to the WiFi user, the PDN connection default bearer corresponding to the WiFi user is established. The Home GW records a mapping between the WiFi UE and the PDN connection default bearer corresponding to the access user.

S4036: The P-GW starts a WiFi UE charging procedure. After the PDN connection default bearer corresponding to the WiFi user is successfully established, the P-GW records an IMSI/MSISDN of the WiFi UE corresponding to the PDN connection, namely, the access user identifier, and starts the WiFi UE charging procedure.

After the PDN connection corresponding to the WiFi user is successfully established, service data may be initiated, and the LTE-EPC network performs Qos management and charging by taking the PDN connection corresponding to the WiFi user as a smallest unit, thereby implementing Qos management and charging according to the WiFi UE. A specific procedure of initiating service data is: The WiFi UE initiates an uplink data service; the Home GW identifies that the user authentication is successful, where an identification method may be IP address identification, and then searches for recorded information, where the information is recorded in the foregoing step S4021; and after the CPE performs network translation, uplink data is mapped to the PDN connection default bearer corresponding to the WiFi user. Downlink data at the network side is mapped to a PDN connection default bearer corresponding to a corresponding WiFi user by the P-GW according to different destination addresses, converted by the AP of the Home GW network, and sent to the corresponding WiFi UE through a wireless local area network air interface. A mapping manner of network translation is recorded by the Home GW in the foregoing step S4035.

S404: Perform the WiFi UE charging procedure.

Figure 7:
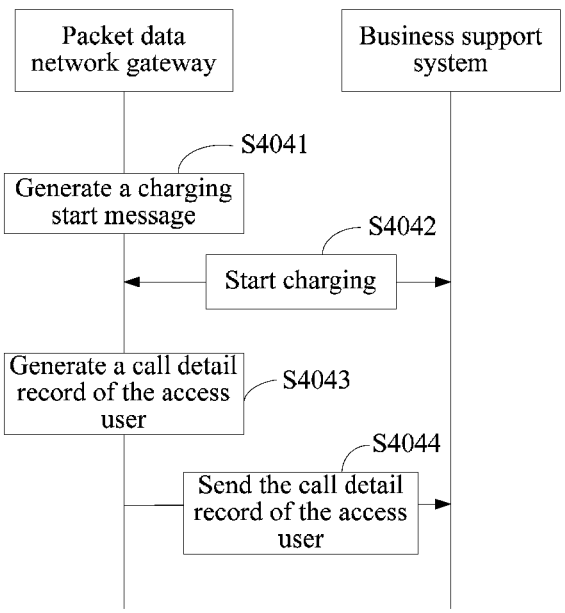
FIG. 7 is a flowchart of a WiFi UE charging procedure according to an embodiment of the present invention.

A specific implementation solution of the charging procedure, as shown in FIG. 7, includes steps S4041 to S4044.

S4041: The P-GW generates a charging start message carrying the access user identifier. The message uses the IMSI/MSISDN of the WiFi user as the access user identifier, and a field is extended to carry an IMSI/MSISDN of a corresponding CPE.

S4042: Start charging. The P-GW sends the charging start message to the BSS, so that the BSS starts the charging procedure.

S4043: The P-GW generates a call detail record of the access user carrying the WiFi access user identifier. After the WiFi UE initiates service data, the P-GW performs charging in a unit of the PDN connection corresponding to the WiFi user.

S4044: The P-GW sends the call detail record of the WiFi access user to the BSS. The P-GW may periodically send the call detail record of the WiFi access user to the BSS, and the BSS integrates the call detail records of the WiFi access user to generate a unified call detail record. It should be noted that, the foregoing charging manner is postpaid charging, and in an actual application, the charging manner may also be prepaid charging. A charging procedure is substantially the same as the procedure in the prior art. When the call detail record is reported, the WiFi IMSI/MSISDN is used as the user identifier, and a field is extended to carry the IMSI/MSISDN of the corresponding CPE, so that the BSS generates a unified call detail record according to users of the Home GW.

S405: Stop charging when the WiFi UE is offline. The Home GW may perceive that the WiFi UE is offline in many ways. For example, it is detected that the WiFi UE is offline through a heartbeat mechanism between the Home GW and the WiFi UE; or a portal server (Portal Server) detects that the WiFi UE is offline, and sends a message to the authentication point Home GW; or the AAA deletes the WiFi UE registration information, and sends a user deletion message to the authentication point Home GW. After perceiving that the WiFi UE is offline, the Home GW needs to send a message for deleting the PDN connection corresponding to the access user to the EPC. In this case, the P-GW receives the message for deleting the PDN connection corresponding to the access user, stops charging the WiFi UE, and then generates a charging stop message carrying the access user identifier, and sends the charging stop message to the BSS, so that the BSS stops charging. Meanwhile, the P-GW further needs to report a final call detail record to the BSS.

Particularly, when receiving a PDN deletion message, the P-GW needs to send information for deleting the PDN connection default bearer corresponding to the WiFi user to the Home GW. The Home GW returns information for accepting deletion of the PDN connection default bearer corresponding to the WiFi user, and deletes information related to the WiFi UE.

It should be noted that, after being started, the Home GW not only needs to establish a public service PDN connection for bearing public information such as WiFi UE authentication, but may further establish an independent PDN connection. A shared service is a service that does not require a network side to distinguish users, such as an IMS (IP Multimedia Subsystem, IP multimedia subsystem) service. A service borne by the PDN connection corresponding to the WiFi user includes a network side service of the WiFi user in the wireless local area network. The independent service PDN connection distinguishes a part of original services borne by the PDN connection corresponding to the WiFi user for bearing, and shared services of all WiFi users accessing the LTE network may be borne by the independent service PDN connection. The Home GW needs to preset APN information, and the APN information needs to be carried during establishment of the public service PDN and establishment of the shared service PDN connection, where the APN information is used for distinguishing PDN connections corresponding to different services.

When the Home GW is started, the shared service PDN establishes a corresponding independent PDN connection default bearer, and the EPC notifies, through a bearer modification message, the Home GW of TFT (traffic flow template) information corresponding to the independent PDN connection default bearer. The TFT information is used for distinguishing services of different bearers, and includes TFT information of all shared services, such as IMS signaling, IMS data and operator private services. If further service differentiation is required, for example, IMS data and operator private services need to be differentiated, the P-GW may distinguish a service type through SPI (Stateful Packet Inspection)/DPI (Deep Packet Inspection) and establish a corresponding dedicated bearer, where the distinguishing is performed by using a principle of higher priority TFT.

Figure 8:
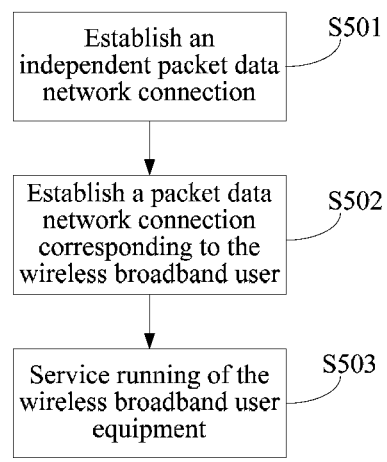
FIG. 8 is a flowchart of establishing an independent PDN connection according to an embodiment of the present invention.

Herein, establishment of two PDN connections for bearing different services is further described still by taking an example that a WiFi user of a WLAN accesses an LTE network. A specific implementation solution is shown in FIG. 8.

S501: Establish an independent PDN connection. When a Home GW is started, a public service PDN connection is established, and at the same time, APN information is carried. This is the same as the prior art, so details are not described. The Home GW sends a message which is for establishing an independent PDN connection and carries the APN information, so as to establish the independent PDN connection. A P-GW establishes a corresponding independent PDN connection default bearer, where the default bearer corresponds to a shared service. Then, the P-GW notifies, by sending a bearer modification message, the Home GW of TFT information corresponding to the independent PDN connection default bearer, where the TFT information is used for distinguishing the shared service during data transmission of the WiFi UE subsequently. The P-GW obtains corresponding Qos and TFT information from a PCRF by using an IMSI of a CPE as a user identifier.

S502: Establish a PDN connection corresponding to a WiFi user. When WiFi UE authentication is successful, the Home GW establishes the PDN connection corresponding to the WiFi user, the P-GW establishes a PDN connection default bearer corresponding to the WiFi user, and the P-GW obtains Qos and TFT information related to the WiFi UE from the PCRF by using the IMSI of the corresponding CPE carried in an extended field as the access user identifier. In this case, the PDN connection default bearer corresponding to the access user corresponds to a WiFi private service.

S503: Service running of the WiFi UE. The WiFi UE initiates service data, and the Home GW determines, according to a TFT of the shared service, whether to map the data to a PDN connection bearer of the shared service, and then maps, according to a mapping between the WiFi UE and the PDN connection which corresponds to the access user and corresponds to the private service, data which is of a non-shared service and is of a valid user whose authentication is successful to the PDN connection default bearer corresponding to the WiFi user that corresponds to the WiFi UE. Public data such as WiFi UE authentication is mapped to a public service PDN connection default bearer.

Particularly, the shared service corresponding to the independent PDN connection may need to be further differentiated; for example, IMS service signaling and a media stream have different Qos requirements, and generally need to correspond to different bearers. The P-GW needs to support SPI or DPI so as to differentiate different services, and further establish a corresponding dedicated bearer in the independent PDN connection in addition to the independent PDN connection default bearer, where when being established, the dedicated bearer carries high-priority TFT information for service differentiation by the Home GW. If a service supports AF (Application Function) dynamic PCC (Policy and Charging Control) architecture, service differentiation through SPI/DPI is not required, and when a service signaling bearer is established, establishment of a corresponding data-plane dedicated bearer is triggered.

The WiFi private service corresponding to the PDN connection corresponding to the WiFi user may also need to be further differentiated, for example, a WiFi network service and an operator private service are differentiated. The P-GW distinguishes service types through SPI/DPI, and establishes a corresponding dedicated bearer outside the PDN connection default bearer corresponding to the WiFi user and at the same time the dedicated bearer carries high-priority TFT information.

When the WiFi UE subsequently initiates service data, the Home GW not only needs to map the data to the corresponding PDN connection according to APN information, but also needs to map uplink data to a corresponding bearer according to bearer TFT information in the PDN connection.

The downlink data is mapped to the corresponding PDN connection by the P-GW according to different destination IP addresses, and then mapped to a specific bearer according to the bearer downlink TFT information.

In the method for network convergence provided in the embodiment of the present invention, the first gateway sends, to the second gateway, the PDN connection establishment message corresponding to an access user, so that after the PDN connection corresponding to the access user is established, the second gateway initiates, according to the access user identifier, the charging procedure corresponding to the access user. The charging procedure is implemented, in a charging manner of the network to which the access user belongs, on a bearer of the PDN connection corresponding to the access user. Therefore, a communications system can support the charging manner of the network to which the access user belongs, and meanwhile, can implement charging according to the PDN connection corresponding to the access user, which refines a unit of charging, thereby implementing more accurate charging.

Figure 9:
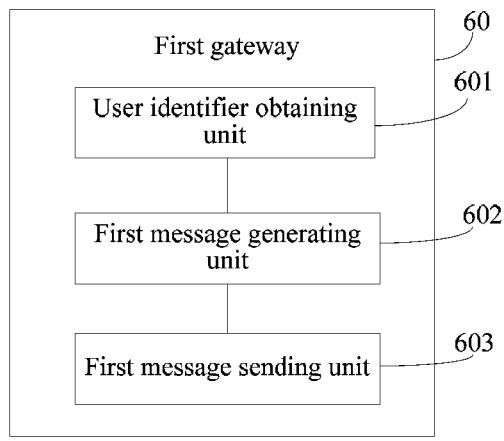
FIG. 9 is a structural diagram of a first gateway according to an embodiment of the present invention.

An embodiment of the present invention further provides a first gateway 60, as shown in FIG. 9, including:

a user identifier obtaining unit 601, configured to obtain an access user identifier in an access user authentication process;

a first message generating unit 602, configured to generate a PDN connection establishment message corresponding to an access user, where the message carries the access user identifier; and a first message sending unit 603, configured to send, to a second gateway, the PDN connection establishment message corresponding to the access user, so that after the PDN connection corresponding to the access user is established, the second gateway initiates, according to the access user identifier, a charging procedure corresponding to the access user, where the second gateway is a gateway of a second network to be accessed by the access user.

In this way, the first message sending unit sends, to the second gateway, the PDN connection establishment message corresponding to an access user, so that after the PDN connection corresponding to the access user is established, the second gateway initiates, according to the access user identifier, the charging procedure corresponding to the access user. The charging procedure is implemented, in a charging manner of the network to which the access user belongs, on a bearer of the PDN connection corresponding to the access user. Therefore, a communications system can support the charging manner of the network to which the access user belongs, and meanwhile, can implement charging according to the PDN connection corresponding to the access user, which refines a unit of charging, thereby implementing more accurate charging.

The user identifier obtaining unit 601 is specifically configured to: receive an authentication request message sent by a portal server; encapsulate the authentication request message to generate encapsulated authentication request information; and send the encapsulated authentication request information to an authentication, authorization and accounting AAA network element, so that the AAA network element initiates user authentication, and after the user authentication is successful, receive encapsulated successful-authentication information that carries the access user identifier and is sent by the AAA network element, where the access user identifier is recorded by the AAA network element in a registration process of the access user. The user identifier obtaining unit may be a single unit or may be formed by a plurality of subunits in the user authentication process, which is not described in detail herein.

Figure 10:
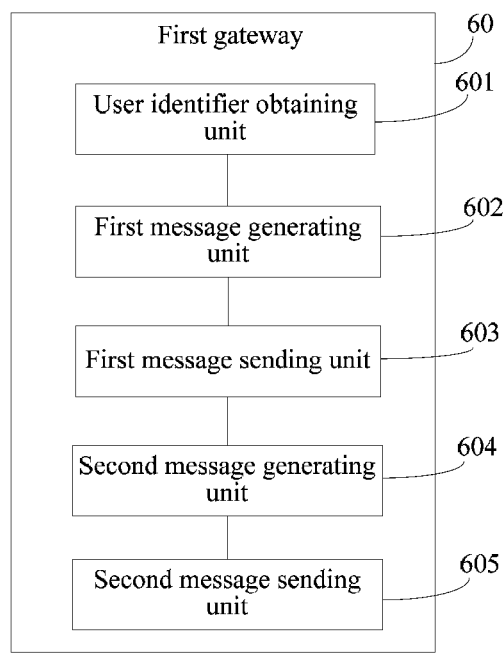
FIG. 10 is a structural diagram of another first gateway according to an embodiment of the present invention.

Further, as shown in FIG. 10, the first gateway 60 further includes:

a second message generating unit 604, configured to, before authentication of an access user is successful, generate a message for establishing an independent PDN connection; and a second message sending unit 605, configured to send, to the second gateway, the message for establishing an independent PDN connection, where a service borne by the independent PDN connection includes a shared service, and the shared service is a service that does not require a network side to distinguish users.

It should be noted that, the PDN connection corresponding to the access user may include more than two links, and the independent PDN connection may include more than two links, so as to implement further service differentiation.

In the first gateway provided in the embodiment of the present invention, the first message sending unit sends, to the second gateway, the PDN connection establishment message corresponding to an access user, so that after the PDN connection corresponding to the access user is established, the second gateway initiates, according to the access user identifier, the charging procedure corresponding to the access user. The charging procedure is implemented, in a charging manner of the network to which the access user belongs, on a bearer of the PDN connection corresponding to the access user. Therefore, the communications system can support the charging manner of the network to which the access user belongs, and meanwhile, can implement charging according to the PDN connection corresponding to the access user, which refines the unit of charging, thereby implementing more accurate charging.

Figure 11:
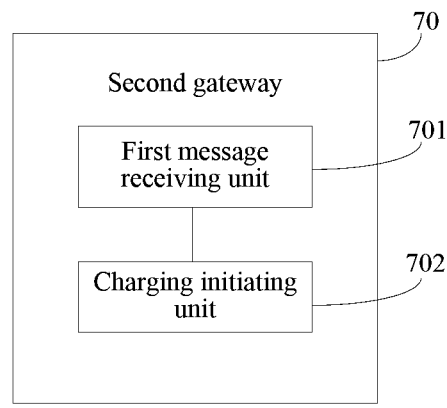
FIG. 11 is a structural diagram of a second gateway according to an embodiment of the present invention.

Meanwhile, an embodiment of the present invention further provides a second gateway 70, as shown in FIG. 11, including:

a first message receiving unit 701, configured to, after authentication of an access user is successful, receive a message for establishing a PDN connection corresponding to an access user, where the message carries an access user identifier and is sent by a first gateway, the first gateway is a gateway of a first network in which the access user is currently located, and a service borne by the PDN connection corresponding to the access user includes a network side service of the access user in the first network; and a charging initiating unit 702, configured to initiate, according to the access user identifier, a charging procedure corresponding to the access user.

In this way, the first message receiving unit receives the PDN connection establishment message corresponding to the access user, where the message is sent by the first gateway, so that after the PDN connection corresponding to the access user is established, the charging initiating unit initiates, according to the access user identifier, the charging procedure corresponding to the access user. The charging procedure is implemented, in a charging manner of the network to which the access user belongs, on a bearer of the PDN connection corresponding to the access user. Therefore, a communications system can support the charging manner of the network to which the access user belongs, and meanwhile, can implement charging according to the PDN connection corresponding to the access user, which refines a unit of charging, thereby implementing more accurate charging.

Figure 12:
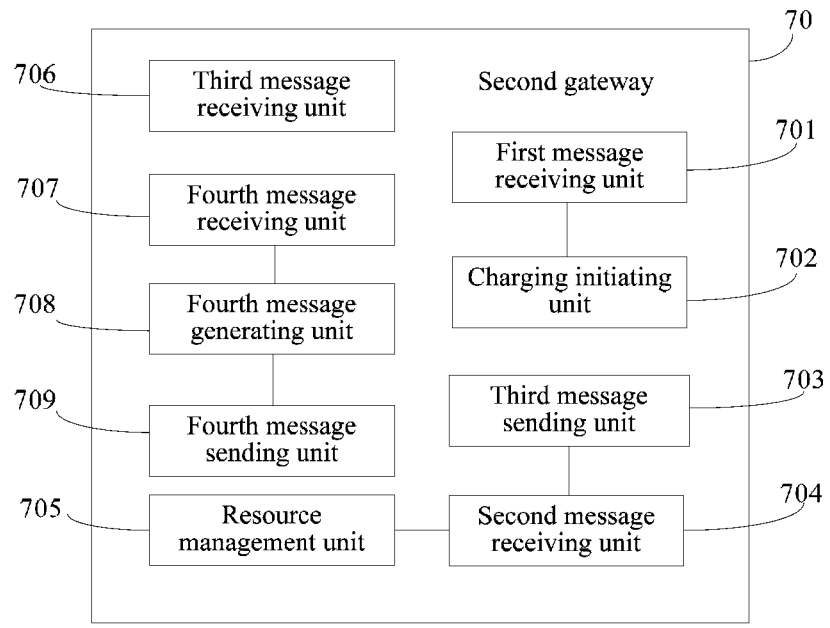
FIG. 12 is a structural diagram of another second gateway according to an embodiment of the present invention.

Further, as shown in FIG. 12, the second gateway 70 further includes:

a third message sending unit 703, configured to send the access user identifier to a policy and charging rules function PCRF network element, so that the PCRF network element searches for and returns access-user quality of service information corresponding to the access user identifier;

a second message receiving unit 704, configured to receive the access-user quality of service information returned by the PCRF network element, where quality of service information corresponding to the access user are recorded in the PCRF network element;

a resource management unit 705, configured to perform, according to the access-user quality of service information, resource management and scheduling control for the PDN connection corresponding to the access user;

a third message receiving unit 706, configured to, before authentication of an access user is successful, receive a message for establishing an independent PDN connection, where a service borne by the independent PDN connection includes a shared service, and the shared service is a service that does not require a network side to distinguish users.

a fourth message receiving unit 707, configured to receive a message for deleting the PDN connection corresponding to the access user;

a fourth message generating unit 708, configured to generate a charging stop message carrying the access user identifier; and a fourth message sending unit 709, configured to send the charging stop message to a BSS, so that the BSS stops charging.

Figure 13:
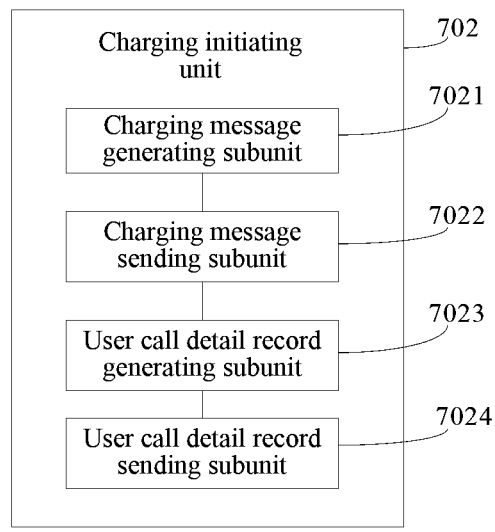
FIG. 13 is a structural diagram of a charging initiating unit according to an embodiment of the present invention.

Meanwhile, as shown in FIG. 13, the charging initiating unit 702 further includes:

a charging message generating subunit 7021, configured to generate a charging start message carrying the access user identifier;

a charging message sending subunit 7022, configured to send the charging start message to a business support system BSS, so that the BSS starts the charging procedure;

a user call detail record generating subunit 7023, configured to generate a call detail record of the access user carrying the access user identifier; and a user call detail record sending subunit 7024, configured to send the call detail record of the access user to the BSS, so that the BSS charges the access user according to the call detail record of the access user.

It should be noted that, the PDN connection corresponding to the access user includes more than two links, and the independent PDN connection includes more than two links.

In the second gateway provided in the embodiment of the present invention, the first message receiving unit receives the PDN connection establishment message corresponding to the access user, where the message is sent by the first gateway, so that after the PDN connection corresponding to the access user is established, the charging initiating unit initiates, according to the access user identifier, the charging procedure corresponding to the access user. The charging procedure is implemented, in a charging manner of the network to which the access user belongs, on a bearer of the PDN connection corresponding to the access user. Therefore, the communications system can support the charging manner of the network to which the access user belongs, and meanwhile, can implement charging according to the PDN connection corresponding to the access user, which refines the unit of charging, thereby implementing more accurate charging.

Figure 14:
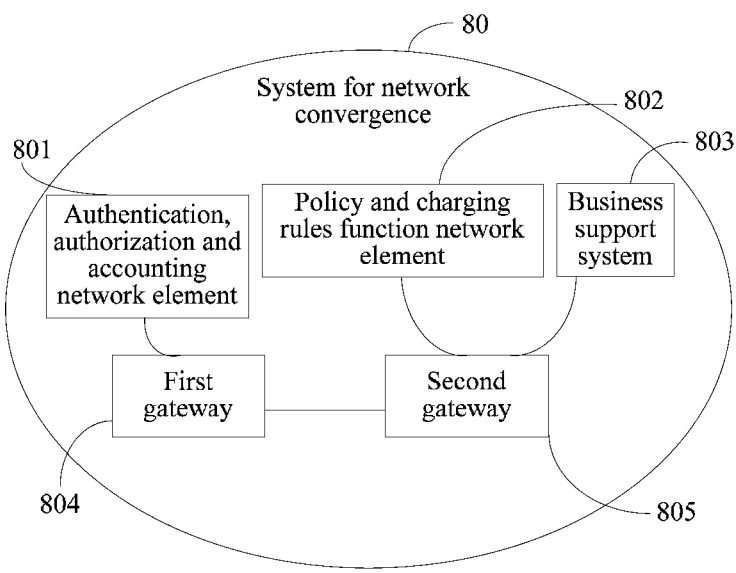
FIG. 14 is a structural diagram of a system for network convergence according to an embodiment of the present invention.

An embodiment of the present invention further provides a system 80 for network convergence, where, as shown in FIG. 14, the system includes:

an AAA network element 801, configured to record an access user identifier during registration of an access user;

a PCRF network element 802, configured to store a charging policy of the access user;

a BSS 803, configured to charge the access user according to a call detail record of the access user;

a first gateway 804, configured to obtain the access user identifier after authentication of the access user is successful, and generate a PDN connection establishment message corresponding to the access user, where the message carries the access user identifier, and a service borne by the PDN connection corresponding to the access user includes a network side service of the access user in a first network; where first gateway 804 is further configured to send, to a second gateway, the PDN connection establishment message corresponding to the access user, so that the second gateway allocates an IP address to the PDN connection corresponding to the access user and initiates, according to the access user identifier, a charging procedure corresponding to the access user, where the first gateway is a gateway of the first network in which the access user is currently located, and the second gateway is a gateway of a second network to be accessed by the access user; where the first gateway 804 is substantially the same as the first gateway 60 described above; and the second gateway 805, configured to, after authentication of an access user is successful, receive the PDN connection establishment message corresponding to an access user, where the message carries the access user identifier and is sent by the first gateway, and initiates, according to the access user identifier, the charging procedure corresponding to the access user; where the second gateway 805 is substantially the same as the second gateway 70 described above.

It should be noted that, the AAA network element 801 is further configured to authenticate and authorize the access user, and notify a CPE of a virtual user identifier of a WiFi user in an LTE-EPC network through an authentication response message. The charging policy recorded by the PCRF network element 802 includes prepaid and postpaid information. Meanwhile, the PCRF network element 802 is further configured to record quality of service information corresponding to the access user.

Particularly, the first gateway includes a home gateway Home GW of a wireless local area network, and the second gateway includes a packet data network gateway P-GW or an MME (Mobility Management Entity, mobility management entity). The Home GW includes a wireless access point AP of the first network and a user end device CPE of the second network. Meanwhile, the system may include more than two access users, where each of the access users corresponds to a corresponding PDN connection.

Particularly, the system for network convergence provided in the embodiment of the present invention may be a system formed by converging the first network and the second network. The first network may be a WLAN network, and the second network may be LTE-TDD (Time Division Duplex, time division duplex), LTE-FDD (Frequency Division Duplex, frequency division duplex), WCDMA or TD-SCDMA (Time Division-Synchronous Code Division Multiple Access, Time Division-Synchronous Code Division Multiple Access). Corresponding gateways and network elements may be modified according to different networks. Variations or replacements may be readily figured out by persons skilled in the art within the technical scope disclosed in the present invention, and details are not described in detail herein.

In the system for network convergence provided in the embodiment of the present invention, a receiving unit of the second gateway receives the PDN connection establishment message corresponding to the access user, where the message is sent by the first gateway, so that after the PDN connection corresponding to the access user is established, the second gateway initiates, according to the access user identifier, the charging procedure corresponding to the access user. The charging procedure is implemented, in a charging manner of the network to which the access user belongs, on a bearer of the PDN connection corresponding to the access user. Therefore, the communications system can support the charging manner of the network to which the access user belongs, and meanwhile, can implement charging according to the PDN connection corresponding to the access user, which refines a unit of charging, thereby implementing more accurate charging.

Persons of ordinary skill in the art should understand that all or a part of the steps implementing the foregoing method embodiments may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk or an optical disk.

The foregoing descriptions are merely specific implementation manners of the present invention, but the protection scope of the present invention is not limited thereto. Any variation or replacement readily figured out by persons skilled in the art within the technical scope disclosed in the present invention shall fall within the protection scope of the present invention. Therefore, the protection scope of the present invention shall be subject to the protection scope of the appended claims.

What is claimed is:

1. A method for network convergence, comprising:
before authentication of an access user is successful, receiving, by a second gateway, a first message for establishing an independent packet data network (PDN) connection, wherein a service borne by the independent PDN connection comprises a shared service, and the shared service is a service that does not require a network side to distinguish users;
after the authentication of the access user is successful, receiving, by the second gateway from a first gateway, a second message for establishing a PDN connection that serves only the access user, wherein the second message carries an identifier of the access user, the first gateway is a gateway of a first network in which the access user is currently located, and the second gateway is a gateway of a second network to be accessed by the access user, establishing the PDN connection between the first and second gateways that serves only the access user, wherein the PDN connection is associated with an IMSI (International Mobile Subscriber Identity)/MSISDN (Mobile Station International ISDN Number) of the access user, and the PDN connection bears a private network side service of the access user in the first network; and initiating at the second gateway, according to the identifier of the access user, a charging procedure directly implemented on the access user based on the established PDN connection that serves only the access user.

2. The method according to claim 1, further comprising:
sending the access user identifier to a policy and charging rules function (PCRF) network element, to enable the PCRF network element to search for and return access-user quality of service information corresponding to the access user identifier;
receiving the access-user quality of service information returned by the PCRF network element, wherein the access-user quality of service information corresponding to the access user identifier is recorded in the PCRF network element; and
performing, according to the access-user quality of service information, resource management and scheduling control for the PDN connection corresponding to the access user.

3. The method according to claim 1, wherein the PDN connection corresponding to the access user comprises more than two links; and the independent PDN connection comprises more than two links.

4. The method according to claim 1, wherein the initiating, according to the access user identifier, the procedure for charging the access user comprises:
generating a charging start message carrying the access user identifier;
sending the charging start message to a business support system (BSS), to enable the BSS to start the charging procedure;
generating a call detail record of the access user carrying the access user identifier; and
sending the call detail record of the access user to the BSS, to enable the BSS to charge the access user according to the call detail record of the access user.

5. The method according to claim 4, further comprising:
receiving a message for deleting the PDN connection corresponding to the access user;
generating a charging stop message carrying the access user identifier; and
sending the charging stop message to the BSS, to enable the BSS to stop charging.

6. A first gateway in a first network, comprising a processor and a non-transitory computer readable medium including processor-executable instructions, which when executed cause the processor to:
obtain an access user identifier in an access user authentication process;
generate a package data network (PDN) connection establishment message corresponding to an access user, wherein the message carries the access user identifier;
send, to a second gateway in a second network, the PDN connection establishment message corresponding to the access user, to trigger the second gateway to initiate, according to the access user identifier, a procedure for charging the access user that is native to the first network so that both the first network and the second network use the procedure for charging the access user, after a PDN connection between the first and second gateways is established by the second gateway, wherein the PDN connection which serves only the access user, is associated with an IMSI (International Mobile Subscriber Identity)/MSISDN (Mobile Station International ISDN Number) of the access user, and comprises a destination address of a network side service of the access user in the first network; and
before the authentication of an access user is successful, generate a message for establishing an independent PDN connection; and
send, to the second gateway, the message for establishing the independent PDN connection, wherein a service borne by the independent PDN connection comprises a shared service, and the shared service is a service that does not require a network side to distinguish users;
wherein the first gateway is a gateway of the first network in which the access user is currently located, and the second gateway is a gateway of the second network to be accessed by the access user.

7. The first gateway according to claim 6, wherein the instructions further cause the processor to:
receive an authentication request message sent by a portal server;
encapsulate the authentication request message to generate encapsulated authentication request information; and
send the encapsulated authentication request information to an authentication, authorization and accounting (AAA) network element, to enable the AAA network element to initiate user authentication, and after the user authentication is successful, receive encapsulated successful-authentication information that carries the access user identifier and is sent by the AAA network element, wherein the access user identifier is recorded by the AAA network element in a registration process of the access user.

8. The first gateway according to claim 6, wherein the PDN connection corresponding to the access user comprises more than two links; and the independent PDN connection comprises more than two links.

9. A second gateway, comprising a processor and a non-transitory computer readable medium including processor-executable instructions, which when executed cause the processor to:
before the authentication of the access user is successful, receive a message for establishing an independent PDN connection, wherein a service borne by the independent PDN connection comprises a shared service, and the shared service is a service that does not require a network side to distinguish users;
after authentication of an access user is successful, receive a packet data network (PDN) connection establishment message corresponding to the access user, wherein the message carries an access user identifier and is sent by a first gateway, the first gateway is a gateway of a first network in which the access user is currently located, and the second gateway is a gateway of a second network to be accessed by the access user,
establish a PDN connection between the first and second gateways that serves only the access user, wherein the PDN connection is associated with an IMSI (International Mobile Subscriber Identity)/MSISDN (Mobile Station International ISDN Number) of the access user, and the PDN connection bears a network side service of the access user in the first network; and initiate, according to the access user identifier, a procedure for charging the access user that is native to the first network so that both the first and second networks use the procedure for charging the access user.

10. The second gateway according to claim 9, wherein the instructions further cause the processor to:
send the access user identifier to a policy and charging rules function (PCRF) network element, to enable the PCRF network element to search for and to return access-user quality of service information corresponding to the access user identifier;
receive the access-user quality of service information returned by the PCRF network element, wherein quality of service information corresponding to the access user is recorded in the PCRF network element; and
perform, according to the access-user quality of service information, resource management and scheduling control for the PDN connection corresponding to the access user.

11. The second gateway according to claim 9, wherein the instructions further cause the processor to:
generate a charging start message carrying the access user identifier;
send the charging start message to a business support system (BSS), to enable the BSS to start the charging procedure;
generate a call detail record of the access user carrying the access user identifier; and
send the call detail record of the access user to the BSS, to enable the BSS to charge the access user according to the call detail record of the access user.

12. The second gateway according to claim 11, wherein the instructions further cause the processor to:
receive a message for deleting the PDN connection corresponding to the access user;
generate a charging stop message carrying the access user identifier; and
send the charging stop message to the BSS, to disable the BSS from charging.

13. The second gateway according to claim 9, wherein the PDN connection corresponding to the access user comprises more than two links; and the independent PDN connection comprises more than two links.

* * * * *